(12) United States Patent
Thieffry

(10) Patent No.: US 8,893,638 B2
(45) Date of Patent: Nov. 25, 2014

(54) FLOATING SUPPORT FOR OFFSHORE STRUCTURE SUCH AS A WIND GENERATOR IN PARTICULAR

(75) Inventor: Philippe Thieffry, Larmor Plage (FR)

(73) Assignee: DCNS, Paris (FR)

( * ) Notice: Subject to any disclaimer, the term of this patent is extended or adjusted under 35 U.S.C. 154(b) by 192 days.

(21) Appl. No.: 13/575,701

(22) PCT Filed: Jan. 28, 2011

(86) PCT No.: PCT/FR2011/050179
§ 371 (c)(1),
(2), (4) Date: Aug. 31, 2012

(87) PCT Pub. No.: WO2011/092437
PCT Pub. Date: Aug. 4, 2011

(65) Prior Publication Data
US 2012/0318186 A1  Dec. 20, 2012

(30) Foreign Application Priority Data
Jan. 29, 2010  (FR) ...................................... 10 50634

(51) Int. Cl.
| | | |
|---|---|---|
| *B63B 35/44* | (2006.01) | |
| *E02B 17/02* | (2006.01) | |
| *B63B 9/06* | (2006.01) | |
| *F03D 11/04* | (2006.01) | |
| *E02B 17/00* | (2006.01) | |

(52) U.S. Cl.
CPC ............... *E02B 17/027* (2013.01); *B63B 9/065* (2013.01); *F03D 11/045* (2013.01); *E02B 2017/0091* (2013.01); *F05B 2240/93* (2013.01); *F05B 2240/95* (2013.01); *Y02E 10/727* (2013.01)
USPC ......................................................... 114/264

(58) Field of Classification Search
CPC ............... Y02E 10/727; F05B 2240/95; F05B 2240/93; F05B 2240/96
USPC ................................... 114/264, 265, 266, 267
See application file for complete search history.

(56) References Cited

U.S. PATENT DOCUMENTS

| | | | |
|---|---|---|---|
| 3,702,105 A * | 11/1972 | Feldman | 114/293 |
| 4,437,794 A * | 3/1984 | Grimsley et al. | 405/224 |
| 7,156,586 B2 * | 1/2007 | Nim | 405/223.1 |
| 2003/0168864 A1 | 9/2003 | Heronemus et al. | |

FOREIGN PATENT DOCUMENTS

| | | |
|---|---|---|
| DE | 201 00 588 U1 | 3/2001 |
| DE | 101 01 405 A1 | 7/2002 |

(Continued)

OTHER PUBLICATIONS

International Search Report, dated Mar. 31, 2011, from corresponding PCT application.

*Primary Examiner* — Lars A Olson
*Assistant Examiner* — Anthony Wiest
(74) *Attorney, Agent, or Firm* — Young & Thompson

(57) ABSTRACT

This floating support for an offshore structure such as a wind generator in particular, of the type including an element in the form of a support mast (16), the upper part of winch is associated with the structure and the lower part of winch is associated with elements (18) in the form of float and with ballast-forming elements (17), is characterized in that the elements (18) in the form of a float have an overall shape winch widens out from the lower part of the element (16) in the form of a mast, allowing two stable positions of the support to be defined, one of the positions being a lying-down position and the other a position standing up on the elements in the form of a float.

6 Claims, 2 Drawing Sheets

(56) References Cited

FOREIGN PATENT DOCUMENTS

Figure 1:
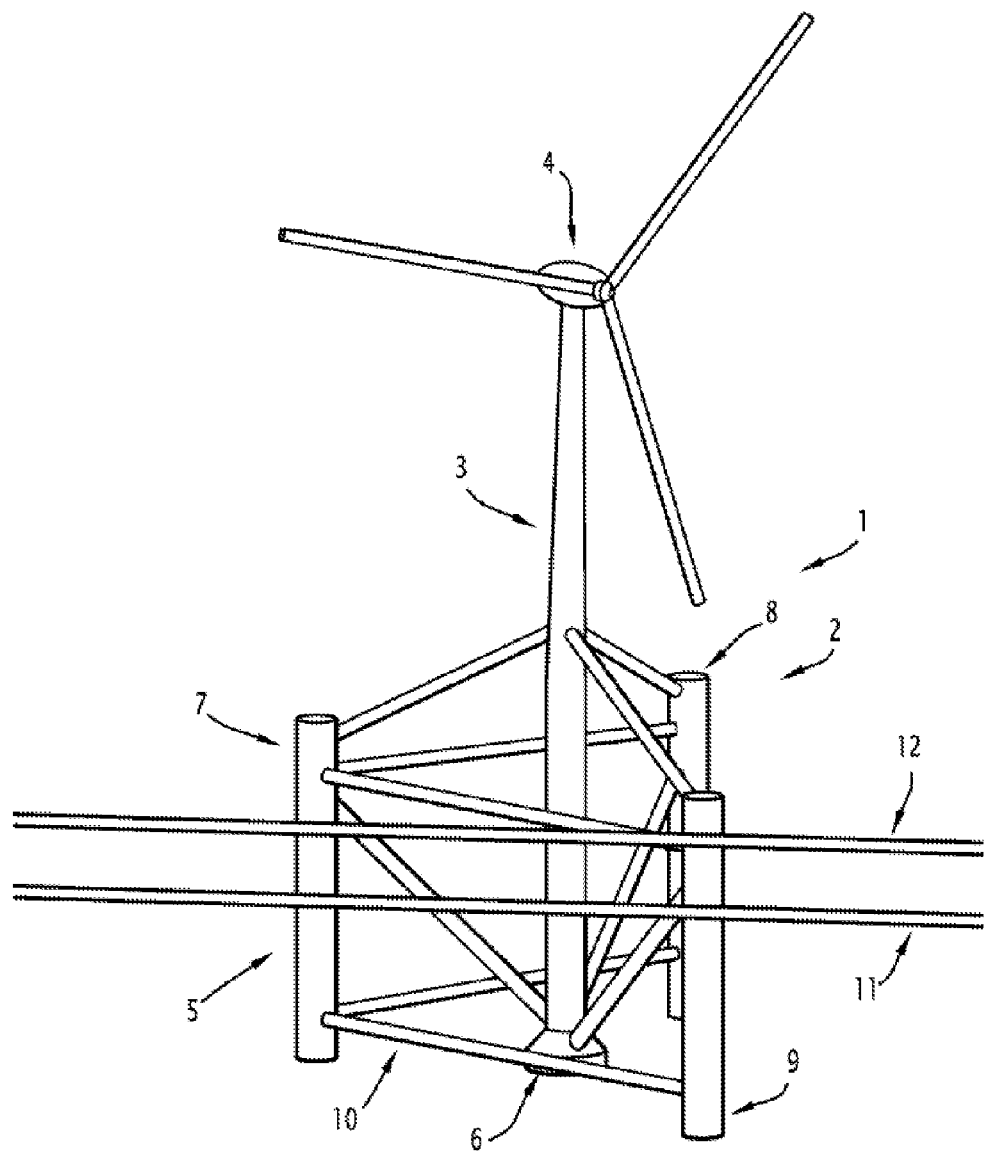

| | | |
|---|---|---|
| DE | 10 2007 006011 A1 | 8/2008 |
| FR | 2967642 A1 * | 5/2012 |
| WO | WO 2009087200 A2 * | 7/2009 |
| WO | 2010/021655 A2 | 2/2010 |

* cited by examiner

FLOATING SUPPORT FOR OFFSHORE STRUCTURE SUCH AS A WIND GENERATOR IN PARTICULAR

BACKGROUND OF THE INVENTION

1. Field of the Invention

The present invention relates to a floating support for an offshore structure such as a wind generator in particular.

More particularly, the invention relates to such a floating support that comprises means in the form of a support mast, the upper part of which is associated with the structure, such as for example with the nacelle of a wind generator, and the lower part of which is associated with means in the form of a float and with ballast-forming means, the means in the form of a float also being able to be associated with ballast-forming means.

2. Description of the Related Art

A wide varieties of floating supports of this type are already known in the state of the art.

Thus for example, a floating support comprising elongate floats with axes parallel to the axis in the form of a support mast and arranged regularly around them is already known.

This floating support is then put in the water in the vertical position after assembly, deballasted and partially ballasted. The nacelle is then assembled on the corresponding end of the mast-forming means using a crane and supplementary ballast is added to float in an area where the depth allows it.

The floating support is then towed onto the exploitation site in the vertical position. Other floating supports having different structures are also known, but their on-site installation is done in a manner relatively close to that previously described. One can thus see that these different floating supports have a certain number of drawbacks, in particular their assembly, handling, and in particular transport to the exploitation site.

In fact, these different floating supports must be assembled and towed in the vertical position.

The assembly in particular of the nacelle to the end of the mast then requires the use of extremely significant lifting means that are difficult to implement on the site.

SUMMARY OF THE INVENTION

The aim of the invention is therefore to resolve these problems.

To that end, the invention relates to a floating support for an offshore structure such as a wind generator in particular, of the type comprising means in the form of a support mast, the upper part of which is associated with the structure and the lower part of which is associated with means in the form of a float and with ballast-forming means, characterized in that the means in the form of a float have an overall shape which widens out from the lower part of the means in the form of a mast, allowing two stable positions of the support to be defined, one of the positions being a lying-down position and the other a position standing up on the means in the form of a float.

According to other aspects of the invention, the floating support includes one or more of the following features:

- the means in the form of a float include ballast means making it possible to move the support between its two stable positions,
- the means in the form of a float comprise several elongate floats regularly positioned around the means in the form of a mast,
- the lower ends of the various elongate floats are connected to the ballast means at the lower end of the means in the form of a mast,
- the upper ends of the various elongate floats are connected to one another and to the means in the form of a mast by connecting beams,
- the means in the form of a float include at least three elongate floats regularly positioned around the means in the form of a mast,
- the side floats are inclined relative to the means in the form of a mast by an angle comprised between 15° and 45°, and
- the side floats are inclined by an angle approximately equal to 30°.

BRIEF DESCRIPTION OF THE DRAWING FIGURES

Figure 2:
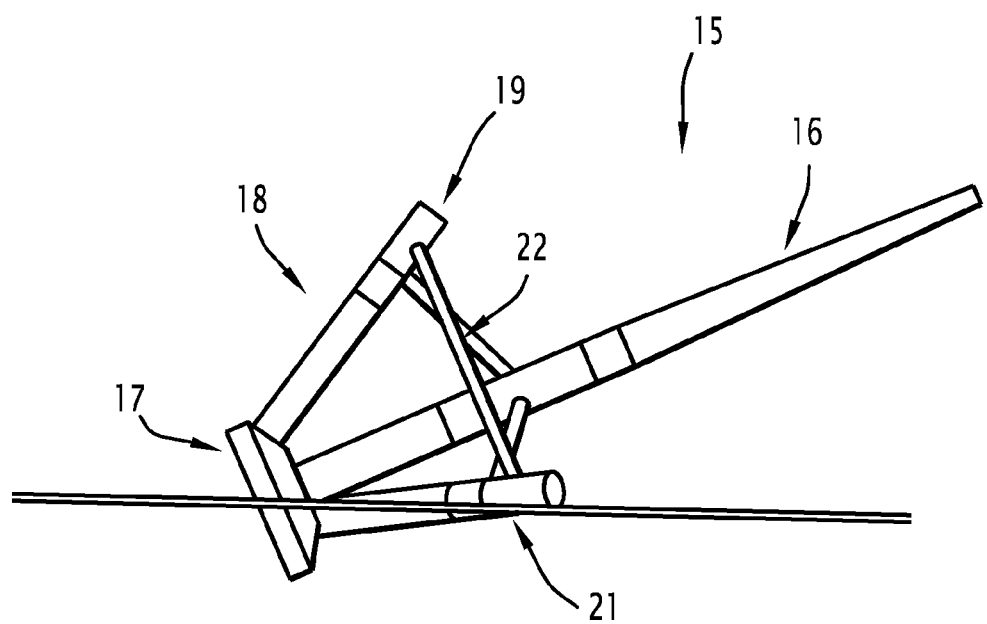
Figure 3:
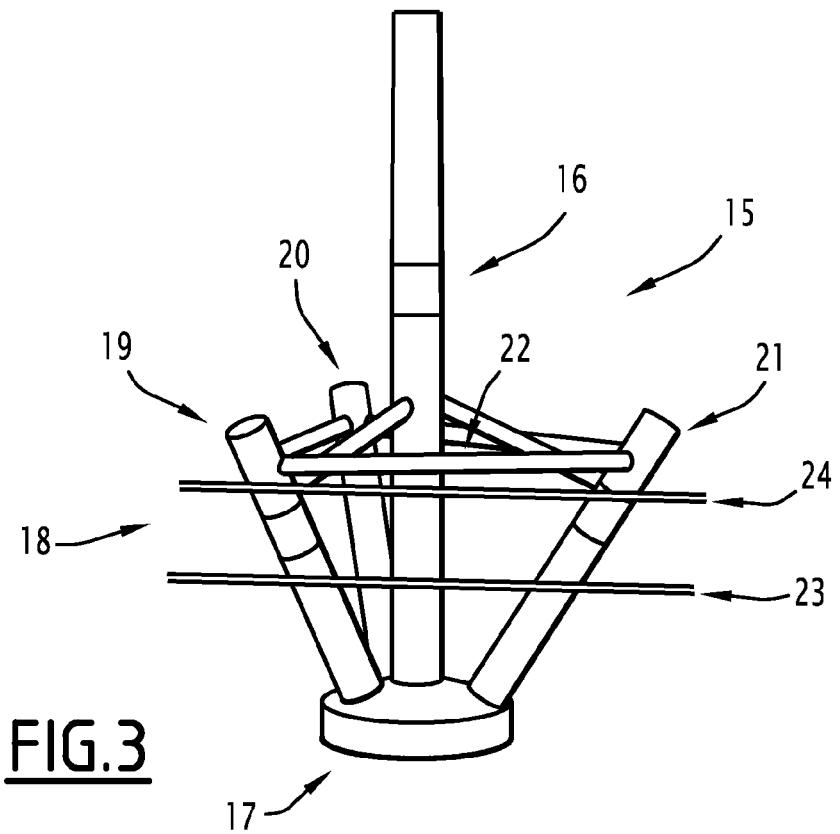

The invention will be better understood using the description that will be provided solely as an example and done in reference to the appended drawings, in which:

FIG. 1 shows a perspective view of an off-shore structure, such as a wind generator in particular, of the state of the art, and FIGS. 2 and 3 show perspective views of an off-shore structure, such as a wind generator in particular, according to the invention, in the lying-down and standing up positions, respectively.

DETAILED DESCRIPTION OF THE INVENTION

FIG. 1 shows a floating support for an off-shore structure such as a wind generator in particular.

This structure is designated by general reference 1 in this figure and the floating support is designated by general reference 2.

This support traditionally comprises means in the form of a support mast designated by general reference 3, the upper part of which is associated with the structure such as a wind generator nacelle for example, designated by general reference 4, and the lower part of which is associated with means in the form of a float, designated by general reference 5, and ballast-forming means designated by general reference 6.

In the embodiment described in this FIG. 1, the ballast-forming means 6 are for example provided at the lower end of the means in the form of a mast 3 and the means in the form of a float for example comprise three elongate floats, for example cylindrical, respectively designated by general references 7, 8 and 9, associated with ballast means.

These floats 7, 8 and 9 are connected to one another and to the means in the form of a mast 3 by connecting beams, one of which is for example designated by general reference 10 in said FIG. 1.

The lines designated by references 11 and 12, respectively, designate the waterline in the deballasted mode 11, for example for transit of the structure and the normal waterline 12.

As previously indicated, such a structure has a certain number of drawbacks, in particular in terms of its assembly and transport.

To resolve these problems, and as illustrated in FIGS. 2 and 3, in the floating support according to the invention, the means in the form of a float have an overall shape which widens out from the lower part of the means in the form of a mast, allowing two stable positions of that support, one being a lying-down position on the means in the form of a float illustrated in FIG. 2, for example for the assembly and transport thereof, and the other being a position standing up illustrated in FIG. 3, for example on the exploitation site.

These FIGS. 2 and 3 show a floating support for an offshore structure such as a wind generator, in particular, which is designated by general reference 15 in these figures.

Traditionally, this floating support comprises means in the form of a mast designated by general reference 16 in these figures, the upper end of which is associated with the structure to be supported, such as the wind generator nacelle for example, and the lower end of which is associated with ballast-forming means, for example designated 17, and means in the form of a float designated by general reference 18.

Traditionally, these means in the form of a float are also associated with ballast means.

According to the invention, the means in the form of a float then have an overall shape which widens out from the lower part of the means in the form of a mast 16 to allow two stable positions of said support, one lying down on the means forming the float, as illustrated in FIG. 2 allowing the assembly and transport of the floating support, and the other standing up in the in-use position, as illustrated in FIG. 3.

The ballast means then make it possible to switch the floating support according to the invention from one of these positions to the other.

As also illustrated in these figures, the means in the form of a float for example comprise elongate floats, such as for example three floats designated by general references 19, 20 and 21, regularly distributed around the means in the form of a mast 16, said floats 19, 20, 21 for example having a cylindrical shape.

The lower ends of these various floats are then associated with ballast-forming means 17 for example, while their upper ends are connected on the one hand to one another, and on the other hand to the means in the form of a mast 16, by connecting beams like those designated by general reference 22 in these figures.

This floating support then has a certain number of advantages inasmuch as it can be assembled and transported in the so-called lying down position on its floats.

In this lying down position, the floating support has a low draught and the means in the form of a mast 16 are then inclined relative to the surface of the water, the upper end of these means in the form of a mast then being far enough from the surface of the water to avoid any risk of wetting of the wind generator nacelle, which can then be assembled directly to the end of the means in the form of a mast during the manufacture of the float for example in a pool, which makes it possible to limit the use of cranes.

The incline of the side floats relative to the means in the form of a mast can be between 15° and 45° and preferably equal to approximately 30° and allow a float inertia that evolves as a function of the draught and therefore the filling level of the ballast means.

In this way and considering the following initial state, support floating vertically, ballasts filled 100%, then gradually emptying said ballasts, the draught of the floating support decreases as well as the float inertia.

This thus results in an unstable position, the consequence of which is an incline of the floating support as far as the lying-down position.

It should be noted that this lying-down position is very stable and the transitions from the lying-down position to the vertical standing up position by filling ballasts is fully controllable.

The lines 23 and 24, respectively, shown in FIG. 3 show the waterlines in the vertical deballasted and normal float modes.

It emerges from the preceding that this floating support has a certain number of advantages relative to the prior solutions, and in particular the elimination of any mounting operation on the exploitation site, which amounts to very significant gains in terms of the costs of the industrial resources to be implemented and greater independence relative to the availability of specific means such as cranes and meteorological conditions.

The structure can then be assembled in a pool without requiring particular lifting means.

Such a structure can also be installed through bottoms smaller than those necessary for the floats of the state of the art, while having a greater intrinsic stability during towing operations.

The floating support according to the invention also has a simpler and more rigid structure than those of the floats of the state of the art, and better stability with a lower weight.

Such a support also offers better damping, in particular in heaving.

Still other embodiments and applications can of course be considered.

The invention claimed is:

1. A floating support for an offshore structure, comprising: a support mast (16), an upper part of which is associated with the structure and a lower part of which is associated with a float (18) and with a ballast-former (17), wherein the float (18) comprises at least three elongate floats (19, 20, 21) regularly positioned around the mast (16) and inclined relative to the mast (16) by an angle between 15° and 45°, the float (18) having an overall cone's frustum shape which widens out from the lower part of the mast (16), allowing two stable positions of the support to be defined, one of the positions being a lying-down position and the other a position standing up on the float (18), wherein lower ends of the elongate floats are connected to the ballast-former (17) at a lower end of the mast (16), wherein upper ends of the elongate floats are connected to one another and to the mast by a connector (22) and the cone's frustum defines a large base and a small base, the large base being closer to the structure than the small base.

2. The floating support according to claim 1, wherein the float (18) includes a ballast making it possible to move the support between its two stable positions.

3. The floating support according to claim 1, wherein the elongate floats (19, 20, 21) are inclined by an angle approximately equal to 30°.

4. A floating support for an offshore wind generator structure, comprising:
   a support mast (16), an upper part of which is associated with the structure and a lower part of which is associated with a float (18) and with a ballast-former (17), wherein the float (18) comprises at least three elongate floats (19, 20, 21) regularly positioned around the mast (16) and inclined relative to the mast (16) by an angle between 15° and 45°, the float (18) having an overall cone's frustum shape which widens out from the lower part of the mast (16), allowing two stable positions of the support to be defined, one of the positions being a lying-down position and the other a position standing up on the float (18), wherein lower ends of the elongate floats are connected to the ballast-former (17) at a lower end of the mast, wherein upper ends of the elongate floats are connected to one another and to the mast by a connector (22), the cone's frustum defining a large base and a small base, the large base being closer to the structure than the small base.

5. The floating support according to claim 4, wherein the float (18) includes a ballast making it possible to move the support between its two stable positions.

6. The floating support according to claim 4, wherein the elongate floats (19, 20, 21) are inclined by an angle approximately equal to 30°.

* * * * *